US010775219B2

(12) United States Patent
Kowalchuk et al.

(10) Patent No.: US 10,775,219 B2
(45) Date of Patent: *Sep. 15, 2020

(54) METER ROLLER AND CUTOFF SYSTEM

(71) Applicant: CNH Industrial Canada, Ltd., Saskatoon (CA)

(72) Inventors: Trevor Lawrence Kowalchuk, Saskatoon (CA); Gordon Anthony Engel, Saskatoon (CA); Jack Donald Turner, Saskatoon (CA); Joel John Octave Gervais, Saskatoon (CA); James Wayne Henry, Saskatoon (CA); Ethan Curtis Stephen Bent, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 192 days.

This patent is subject to a terminal disclaimer.

(21) Appl. No.: 15/878,958

(22) Filed: Jan. 24, 2018

(65) Prior Publication Data
US 2018/0149508 A1    May 31, 2018

Related U.S. Application Data

(62) Division of application No. 14/932,747, filed on Nov. 4, 2015, now Pat. No. 9,909,914.
(Continued)

(51) Int. Cl.
| *G01F 11/00* | (2006.01) |
| *G01F 11/24* | (2006.01) |
| *A01C 7/12* | (2006.01) |

(52) U.S. Cl.
CPC .......... *G01F 11/003* (2013.01); *A01C 7/122* (2013.01); *A01C 7/125* (2013.01); *A01C 7/127* (2013.01); *G01F 11/24* (2013.01)

(58) Field of Classification Search
CPC ........ G01F 11/003; G01F 11/00; G01F 11/24; G01F 11/20; G01F 11/12; G01F 11/10;
(Continued)

(56) References Cited

U.S. PATENT DOCUMENTS

| 936,883 A | 10/1909 | Garwood |
| 1,134,894 A | 4/1915 | Newton |

(Continued)

FOREIGN PATENT DOCUMENTS

| GB | 352162 A | 7/1931 |
| GB | 2162338 A | 1/1986 |

OTHER PUBLICATIONS

U.S. Appl. No. 16/001,708, filed Jun. 6, 2018, Gervais et al.
(Continued)

*Primary Examiner* — Christopher J. Novosad
(74) *Attorney, Agent, or Firm* — Rebecca L. Henkel; Rickard K. DeMille

(57) ABSTRACT

A system includes an agricultural metering system a meter roller configured to meter product from an agricultural product storage compartment to a product distribution system via rotation of the meter roller. The meter roller includes a first meter roller segment having a first plurality of flutes and a corresponding first plurality of recesses, and a second meter roller segment having a second plurality of flutes and a corresponding second plurality of recesses. The first meter roller segment includes a first profile, the second meter roller includes a second profile, and the first profile is different from the second profile. The system also has a dividing ring axially positioned between the first meter roller segment and the second meter roller segment.

19 Claims, 12 Drawing Sheets

Related U.S. Application Data

(60) Provisional application No. 62/075,202, filed on Nov. 4, 2014.

(58) Field of Classification Search
CPC ........... A01C 7/122; A01C 7/121; A01C 7/12; A01C 7/08; A01C 7/00; A01C 7/125; A01C 7/127

See application file for complete search history.

(56) References Cited

U.S. PATENT DOCUMENTS

| | | |
|---|---|---|
| 3,489,321 A | 1/1970 | Kirschmann |
| 4,259,912 A | 4/1981 | Stocks et al. |
| 4,609,131 A | 9/1986 | Tieben |
| 5,025,951 A | 6/1991 | Hook et al. |
| 5,109,893 A | 5/1992 | Derby |
| 5,549,060 A | 8/1996 | Schick et al. |
| 5,878,679 A | 3/1999 | Gregor et al. |
| 5,924,370 A | 7/1999 | Gregor et al. |
| 5,980,163 A | 11/1999 | Gregor et al. |
| 6,138,591 A | 10/2000 | Horsch |
| 6,158,630 A | 12/2000 | Mayerle et al. |
| 7,100,522 B2 | 9/2006 | Mayerle |
| 7,428,874 B2 | 9/2008 | Jones et al. |
| 7,472,808 B2 | 1/2009 | Hanaoka et al. |
| 7,565,871 B2 | 7/2009 | Audette |
| 7,765,943 B2 | 8/2010 | Landphair et al. |
| 8,166,895 B2 | 5/2012 | Dean et al. |
| 8,176,797 B2 | 5/2012 | Henry et al. |
| 8,196,534 B2 | 6/2012 | Meyer et al. |
| 8,281,724 B2 | 10/2012 | Snipes |
| 8,336,471 B2 | 12/2012 | Gilstring |
| 8,375,873 B2 | 2/2013 | Nelson et al. |
| 8,434,416 B2 | 5/2013 | Kowalchuk et al. |
| 9,909,914 B2 * | 3/2018 | Kowalchuk ............. G06F 11/24 |
| 10,031,013 B2 * | 7/2018 | Gervais .................. A01C 7/121 |
| 2012/0067258 A1 | 3/2012 | Maro |
| 2012/0174843 A1 | 7/2012 | Friggstad |
| 2012/0174844 A1 | 7/2012 | Friggstad |
| 2012/0230779 A1 | 9/2012 | Dunstan |
| 2012/0301231 A1 | 11/2012 | Jagow et al. |
| 2016/0120112 A1 | 5/2016 | Gervais et al. |

OTHER PUBLICATIONS

U.S. Appl. No. 16/001,783, filed Jun. 6, 2018, Gervais et al.
U.S. Appl. No. 15/878,732, filed Jan. 24, 2018, Kowalchuk et al.
U.S. Appl. No. 15/879,104, filed Jan. 24, 2018, Kowalchuk et al.

* cited by examiner

METER ROLLER AND CUTOFF SYSTEM

CROSS-REFERENCE TO RELATED APPLICATIONS

This application is a divisional of U.S. patent application Ser. No. 14/932,747, entitled "RINGED METER ROLLERS AND SLIDE CUTOFF SYSTEM", filed Nov. 4, 2015, which claims priority from and the benefit of U.S. Provisional Application Ser. No. 62/075,202, entitled "RINGED METER ROLLERS AND SLIDE CUTOFF SYSTEM", filed Nov. 4, 2014. Each of the above-referenced applications is hereby incorporated by reference in its entirety.

BACKGROUND

The present disclosure relates generally to agricultural implements, and more specifically, to ringed meter rollers and a slide cutoff system.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense granular product in the soil opening, and re-close the soil in a single operation. In agricultural implements such as seeders or spreaders, granular products are commonly dispensed from bulk product tanks and distributed to row units by a distribution system. In certain configurations, air carts are towed with the implements to deliver a desired flow of granular products to the row units.

Air carts generally include a seed storage tank, an air source (e.g., a blower) and a metering assembly. The granular products are typically gravity fed from the storage tank to the metering assembly that distributes a desired volume of granular products into an air flow generated by the air source. The air flow then carries the granular products to the row units via conduits extending between the air cart and the agricultural implements. The metering assembly typically includes meter rollers or other metering devices that regulate the flow of granular products based on meter roller geometry and rotation rate. However, some granular products differ in size or desired rate of application, and, thus, different meter rollers may be used for the different products. Replacing meter rollers may be time consuming and inconvenient.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an agricultural metering system a meter roller configured to meter product from an agricultural product storage compartment to a product distribution system via rotation of the meter roller. The meter roller includes a first meter roller segment having a first plurality of flutes and a corresponding first plurality of recesses, and a second meter roller segment having a second plurality of flutes and a corresponding second plurality of recesses. The first meter roller segment includes a first profile, the second meter roller includes a second profile, and the first profile is different from the second profile. The system also has a dividing ring axially positioned between the first meter roller segment and the second meter roller segment.

In a second embodiment, a system includes an agricultural metering system having a housing configured to receive product from an agricultural product storage compartment, a meter roller disposed within the housing and configured to meter the product to a product distribution system via rotation of the meter roller. The meter roller includes a first meter roller segment having a first plurality of flutes and a corresponding first plurality of recesses, and a second meter roller segment having a second plurality of flutes and a corresponding second plurality of recesses. The first meter roller segment includes a first profile, the second meter roller includes a second profile, and the first profile is different from the second profile. The system also includes a slide configured to selectively block at least a portion of the product flowing from the agricultural product storage compartment to the meter roller.

In a third embodiment, a system includes an agricultural metering system with a housing configured to receive product from an agricultural product storage compartment via an opening in the housing, and a meter roller disposed within the housing and configured to meter the product to a product distribution system via rotation of the meter roller. The meter roller includes a first meter roller segment having a first plurality of flutes and a corresponding first plurality of recesses, and a second meter roller segment having a second plurality of flutes and a corresponding second plurality of recesses. The first meter roller segment includes a first profile, the second meter roller includes a second profile, and the first profile is different from the second profile. The system also includes a dividing ring disposed axially between the first meter roller segment and the second meter roller segment. The dividing ring is non-rotatably coupled to the first meter roller segment and to the second meter roller segment. The system also includes a meter roller sleeve configured to surround the meter roller and to translate axially relative to the meter roller to block the product from flowing through the first meter roller segment, the second meter roller segment, or both.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
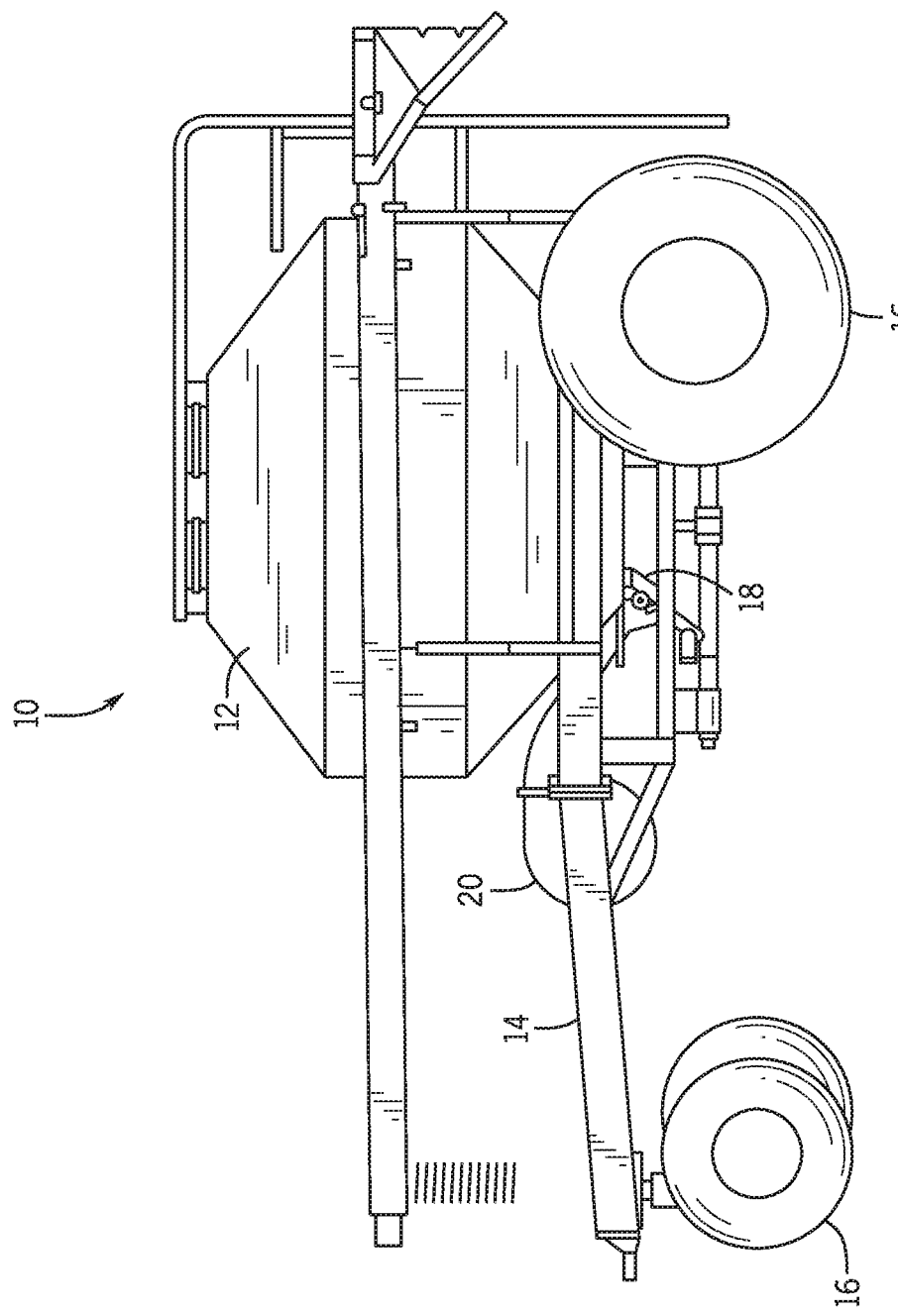
FIG. 1 is a side view of an air cart, including a metering assembly configured to regulate a flow of particulate material.

Turning now to the drawings, FIG. 1 is a side view of an air cart 10 that may be used in conjunction with a towable agricultural implement (e.g., seeder) to deposit agricultural products (e.g., seeds, fertilizer, or other particulate materials) into the soil. For example, certain agricultural implements include row units configured to open the soil, dispense seeds into the soil opening, and re-close the soil in a single operation. Such implements are generally coupled to a tow vehicle, such as a tractor, and pulled through a field. In certain configurations, seeds are conveyed to the row units by the illustrated air cart 10, which is generally towed in sequence with the implement. In alternative configurations, the air cart 10 may be configured to provide fertilizer to the row units, or a combination of seeds and fertilizer.

In the illustrated embodiment, the air cart 10 includes a storage tank 12, a frame 14, wheels 16, a metering assembly 18 and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to deliver both the seeds and the fertilizer to the implement. The frame 14 includes a towing hitch configured to couple to the implement or tow vehicle. As discussed in detail below, seeds and/or fertilizer within the storage tank 12 are provided (e.g., gravity fed into) the metering assembly 18. The metering assembly 18 includes meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
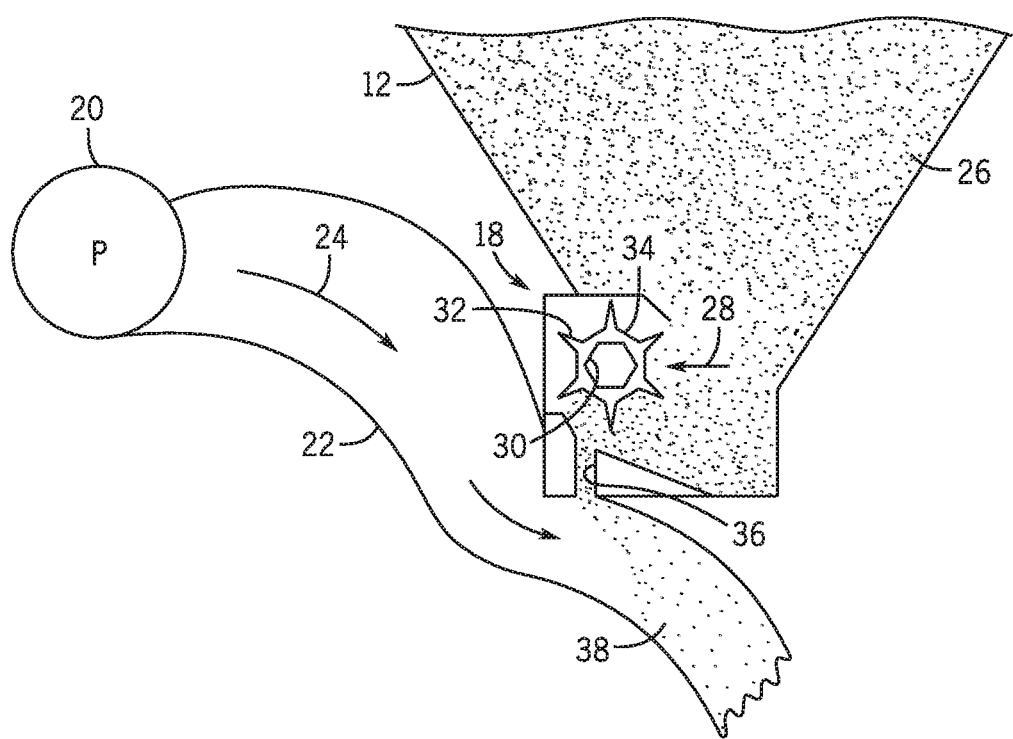
FIG. 2 is a schematic view of the metering assembly, as shown in FIG. 1, including a meter roller.

FIG. 2 is a schematic view of the metering assembly 18, as shown in FIG. 1. As illustrated, the air source 20 is coupled to a conduit 22 configured to flow air 24 past the metering assembly 18. The air source 20 may be a pump or blower powered by an electric or hydraulic motor, for example. Flowable particulate agricultural product 26 (e.g., seeds, fertilizer, etc.) within the storage tank 12 flows by gravity into the metering assembly 18. The metering assembly 18 includes one or more meter rollers 28 configured to regulate the flow of agricultural product 26 into the air flow 24. More particularly, the metering assembly 18 may include multiple meter rollers 28 disposed adjacent to one another. For example, certain metering assemblies 18 include seven meter rollers 28. Such assemblies 18 are known as "7-run" metering assemblies. However, alternative embodiments may include more or fewer meter rollers 28, e.g., 5, 6, 7, 8, 9, or more. Further embodiments may include one continuous meter roller 28.

Each meter roller 28 includes an interior cavity 30 configured to receive a shaft that drives the meter roller 28. In the present embodiment, the cavity 30 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 28. Alternatively, the meter rollers 28 may be coupled to a wheel 16 by a gear assembly such that rotation of the wheel 16 drives the meter rollers 28 to rotate. Such a configuration will automatically vary the rotation rate of the meter rollers 28 based on the speed of the air cart 10. In some embodiments, the meter rollers 28 coupled to each storage tank 12 may be independently controlled (e.g., may be operated at independent rotation rates).

Each meter roller 28 also includes multiple flutes 32 and recesses 34. The number and geometry of the flutes 32 are configured to accommodate the agricultural product 26 being distributed. The illustrated embodiment includes six flutes 32 and a corresponding number of recesses 34. Alternative embodiments may include more or fewer flutes 32 and/or recesses 34. For example, the meter roller 28 may include 2, 4, 6, 8, 10, 12, 14, 16, 18, 20, or more flutes 32 and/or recesses 34. In addition, a depth of the recesses 34 and/or a height of the flutes 32 are configured to accommodate the agricultural product 26 within the storage tank 12. For example, a meter roller 28 having deeper recesses 34 and fewer flutes 32 may be employed for larger seeds, while a meter roller 28 having shallower recesses 34 and more flutes 32 may be employed for smaller seeds. Other parameters such as flute pitch (i.e., rotation relative to a longitudinal axis) and flute angle (i.e., rotation relative to a radial axis) may also be varied in alternative embodiments. For example, as described below with respect to FIG. 10, the flutes 32 may include angled, spiral, helical, or wavy flutes to distribute the product 26 at various rates and directions.

The rotation rate of the meter roller 28 controls the flow of agricultural product 26 into the air stream 24. Specifically, as the meter roller 28 rotates, material is transferred through an opening 36 in the metering assembly 18 into the conduit 22. The material then mixes with air from the air source 20, thereby forming an air/material mixture 38. The mixture then flows to the row units of the implement via pneumatic conduits, where the seeds and/or fertilizer are deposited within the soil. As will be appreciated by those skilled in the art, if the flow rate of material from the meter roller 28 is higher or lower than desired for a particular product, the rate of rotation of the meter roller 28 may be changed. In some situations, however, a change in rotation rate may not be enough to achieve the desired output of agricultural product. In such situations, the meter roller 28 may be replaced. However, as noted above, replacing meter rollers may be time consuming. Accordingly, as explained in detail below, present embodiments may include the meter roller 28 having multiple segments and/or multiple divider rings. The meter roller 28 may be separated from the storage tank 12 by a slide, which is positioned over the meter roller 28 to enable selection of various segments of the meter roller 28 to deliver the agricultural product 26 at a desired product flow rate.

Figure 3:
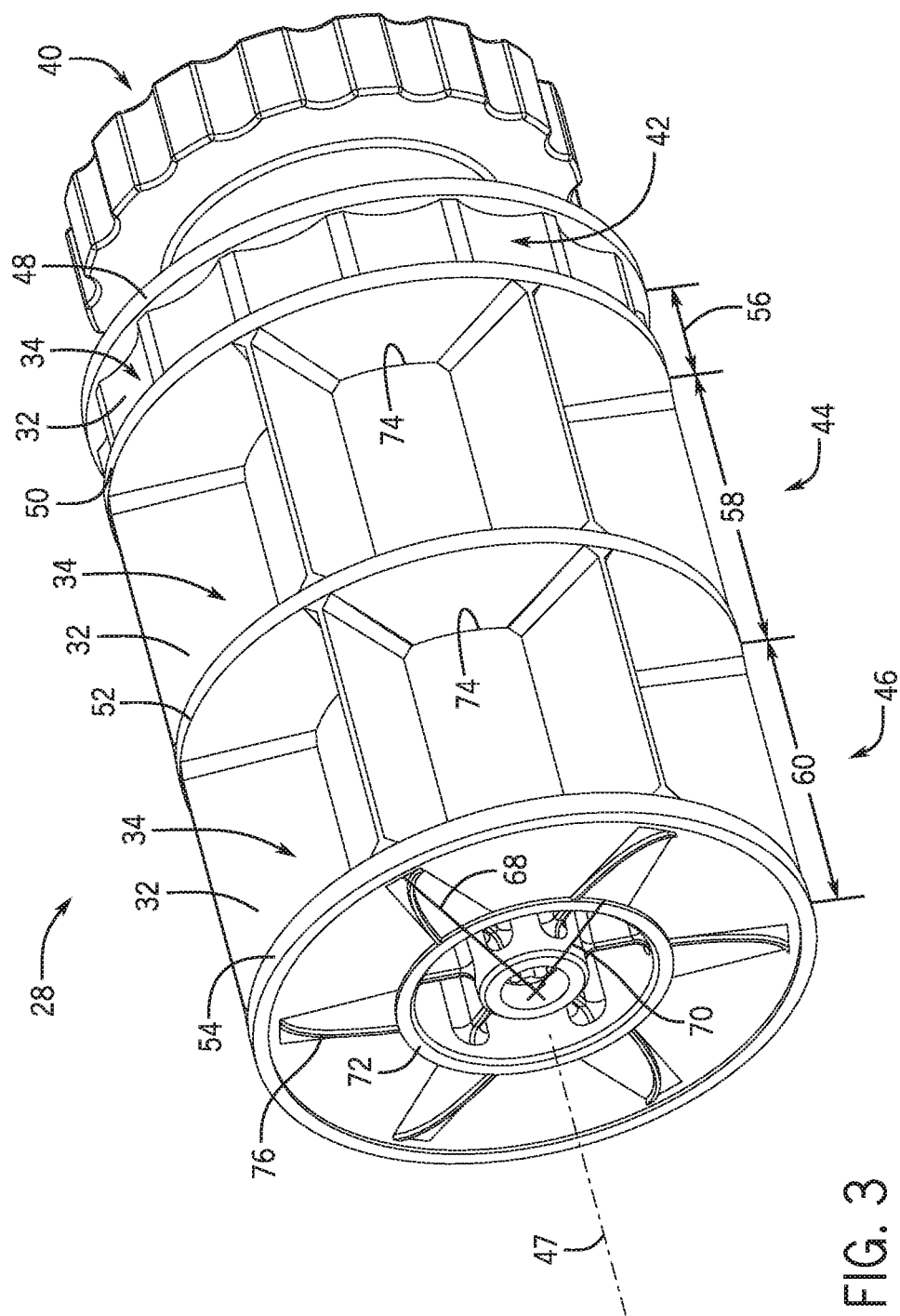
FIG. 3 is a perspective view of an embodiment of a meter roller that may be used in the metering assembly shown in FIG. 2.

FIG. 3 is a perspective view of an embodiment of the meter roller 28. The meter roller 28 may include a knob 40 configured to engage with the meter roller housing and support the end of the meter roller 28 to the drive unit that is configured to drive rotation of the meter roller 28. As mentioned above, the meter roller 28 may be driven by an electric or hydraulic motor, or by connection with one of the wheels 16 of the air cart 10. The meter roller 28 includes three segments 42, 44, 46 configured to deliver the agricultural product 26 to the conduit 22. As illustrated, the first segment 42 includes small, shallow recesses 34 and thus may be used when the agricultural product 26 includes small seeds or fertilizer that is metered at a low flow rate. Each of the second segment 44 and third segment 46 have deeper and larger recesses 34, and, thus, may be used for agricultural products 26 that are metered at a higher rate.

The segments 42, 44, 46 of the meter roller 28 may be axially (e.g., along an axial axis 47) divided by dividing rings 48, 50, 52, 54. In the illustrated embodiment, a first ring 48 and a second ring 50 define an axial width 56 of the first segment 42 of the meter roller 28. As mentioned above, the first segment 42 has shallow recesses 34, but may also include smaller axial width 56, which may be desirable for products that are metered at a low flow rate. The second segment 44 of the meter roller 28 is bordered by the second ring 50 and a third ring 52, which define an axial width 58. Additionally, the third ring 52 and a fourth ring 54 define an axial width 60 of the third segment 46 of the meter roller 28. The second axial width 58 and the third axial width 60 may be the same, as illustrated, or may be different to enable various product flow rates.

As described in detail below, the metering assembly 18 may include a slide that aligns with the dividing rings 48, 50, 52, 54 to enable accurate flow rate of the agricultural product 26. The meter roller 28 may have a radius 68 measured from the axial axis 47 of the meter roller 28. The radius 68 is the same for each of the dividing rings 48, 50, 52, 54 (e.g., an outer surface of each dividing ring has the same radius 68). A consistent outer radius 68 may facilitate alignment of the slide relative to the dividing rings when the slide shifts from one dividing ring to the next. Each dividing ring 48, 50, 52, 54 may also include an inner radius 70 that is sized to fit over a shaft 72. The shaft 72 is non-rotatably coupled to the segments 42, 44, 46 and to the dividing rings 48, 50, 52, 54. The dividing rings 48, 50, 52, 54 are positioned around the shaft 72 and fit between the segments 42, 44, 46 within a gap 74 between each pair of adjacent segments (e.g., between the first segment 42 and the second segment 44, and between the second segment 44 and the third segment 46). This ensures that the dividing rings 48, 50, 52, 54 do not move relative to each other or relative to the roller segments 42, 44, 46.

Figure 4:
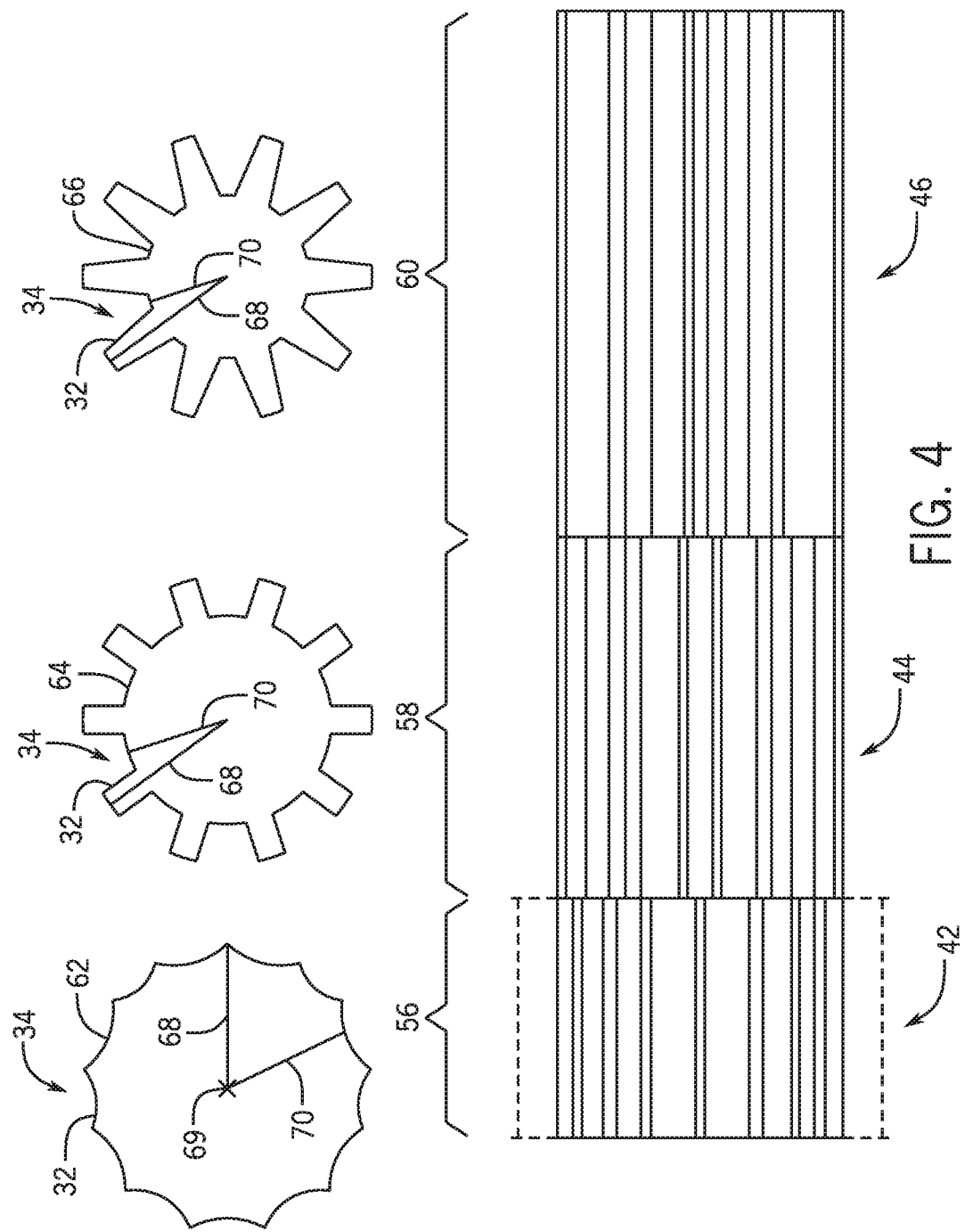
FIG. 4 is a side view of an embodiment of a meter roller that may be used in the system shown in FIG. 2.

FIG. 4 is a side view of an embodiment of the meter roller 28. FIG. 4 also includes a cross-sectional end view for each of the segments 42, 44, 46 of the meter roller 28. As illustrated, each segment 42, 44, 46 includes a profile 62, 64, 66 (e.g., cross-sectional profile) which determines the flow rate for a given speed of rotation of the meter roller 28. As with the embodiment illustrated in FIG. 3, the first segment 42 has a fine profile 62 for products using a fine or low flow rate. The fine profile 62 of the first segment 42 has small recesses 34 defined by a small difference between the outer radius 68 and the inner radius 70. Additionally, as illustrated in FIG. 4 the fine profile 62 of the first segment 42 may include a concave curved flute 32 that may improve flow for small particles of the product 26. The first segment 42 may have a small width 56, as illustrated in FIG. 4 to meter the product 26 at a fine flow rate.

The second segment 44 of the meter roller 28 may include a medium profile 64 and width 58 to facilitate a medium flow rate of the product 26. For example, as illustrated in FIG. 4, the medium profile 64 may have larger recesses 34 with a greater difference between the outer radius 68 and the inner radius 70. The second profile 64 may also have angled flutes 32 and a convex surface 63 at the inner radius 70, rather than the concave curved flutes 32. The medium profile 64 thus supports more product 26 (e.g., as compared to the fine profile 62) within each of the recesses 34 as the meter roller 28 rotates. The second segment 44 may also have a slightly larger width 58 as compared to the width 56 of the first segment 42. In certain embodiments, the width 58 of the second segment 44 and the width 56 of the first segment 42 may be the same.

The third segment 46 of the meter roller 28 may include a profile 66 and width 60 for a coarse flow rate of the product 26. As illustrated, the coarse profile 66 includes deep flutes 32 in which there is a relatively large difference between the inner radius 70 and the outer radius 68. The coarse profile 66 thus enables a higher flow rate than either the medium profile 64 or the fine profile 62. In some embodiments, the coarse segment 44 may have a larger width 60 to further increase the amount of product 26 that is delivered. In other embodiments, the widths of each of the segments 42, 44, 46, or any two of the segments 42, 44, 46 may be the same.

Figure 5:
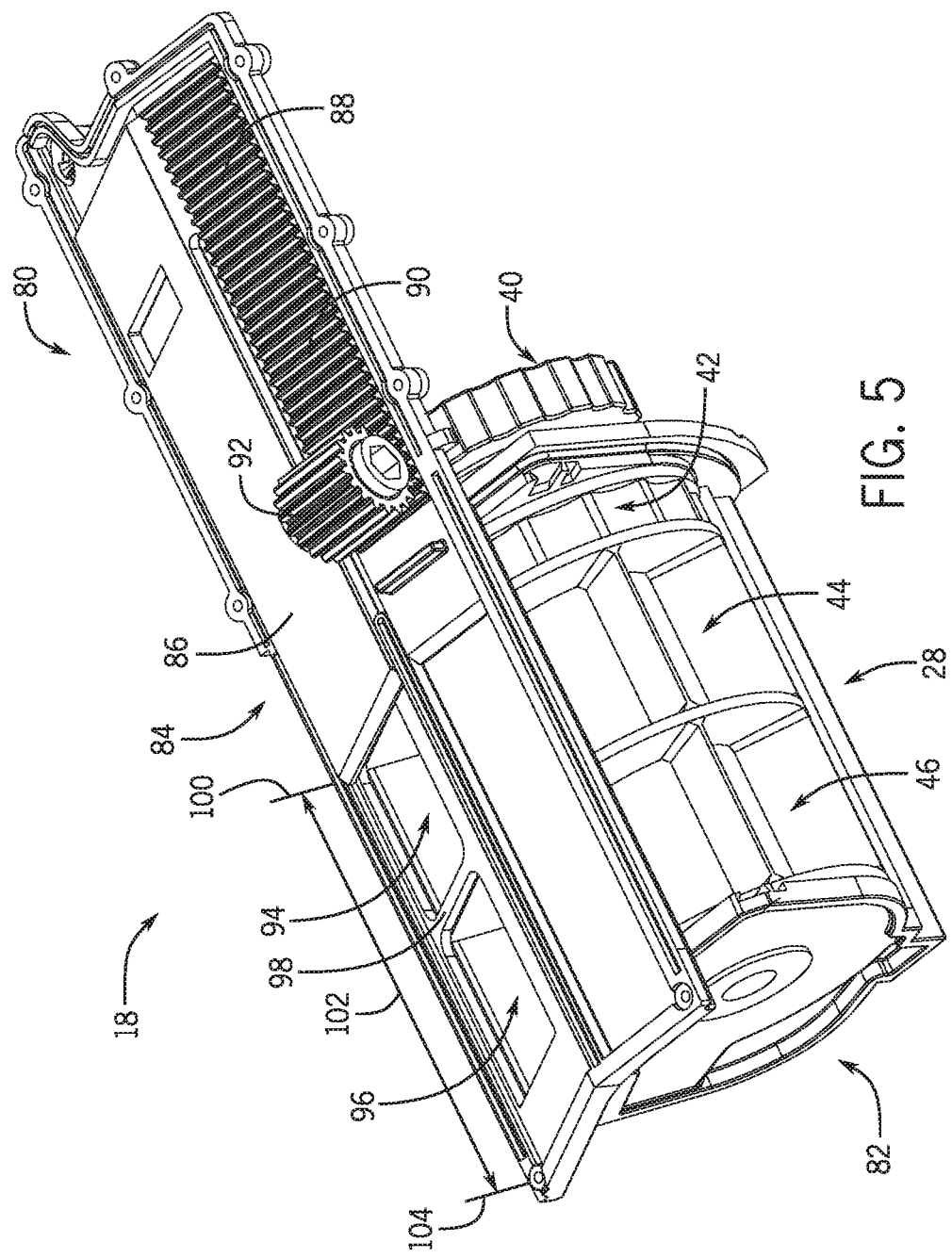
FIG. 5 is a perspective view of an embodiment of the metering assembly with a slide in an open position.

FIG. 5 is a perspective view of an embodiment of the metering assembly 18 with a slide 80 in an open position. A roller housing 82 supports the meter roller 28 and supports the slide 80 in a position over the meter roller 28. The slide 80 is translated within a slide track 84 of the roller housing 82, and a cutoff panel 86 restricts flow of the product 26 from certain segments 42, 44, 46, and allows the product 26 to flow through other segments 42, 44, 46. The slide 80 may, as illustrated, include a groove panel 88 that includes grooves 90 that match with a groove wheel 92. As the groove wheel 92 rotates, the grooves 90 engage with the groove wheel 92 and translate the groove panel 88 and the rest of the slide 80 relative to the meter roller 28. In the illustrated embodiment, the cutoff panel 86 exposes a first hole 94 and a second hole 96, which are separated by a divider 98. The divider 98 is part of the roller housing 82 and maintains a division between the first medium hole 94 and the second medium hole 96. The first hole 94 is aligned with the second segment 44, and the second hole 96 is aligned with the third segment 46.

In the illustrated embodiment of FIG. 5, the slide 80 is positioned at an open position 100, which is an open distance 102 from a distal end 104 of the slide track 84. In the open position 100, each of the first hole 94 (and the second segment 44) and the second hole 96 (and the third segment 46) are exposed, while the fine segment 42 is covered (e.g., blocked). In the open position 100, the metering assembly 18 enables the greatest amount of product 26 to flow through the roller housing 82. In some embodiments, the slide 80 may include an open position that opens all three segments 42, 44, 46.

Figure 6:
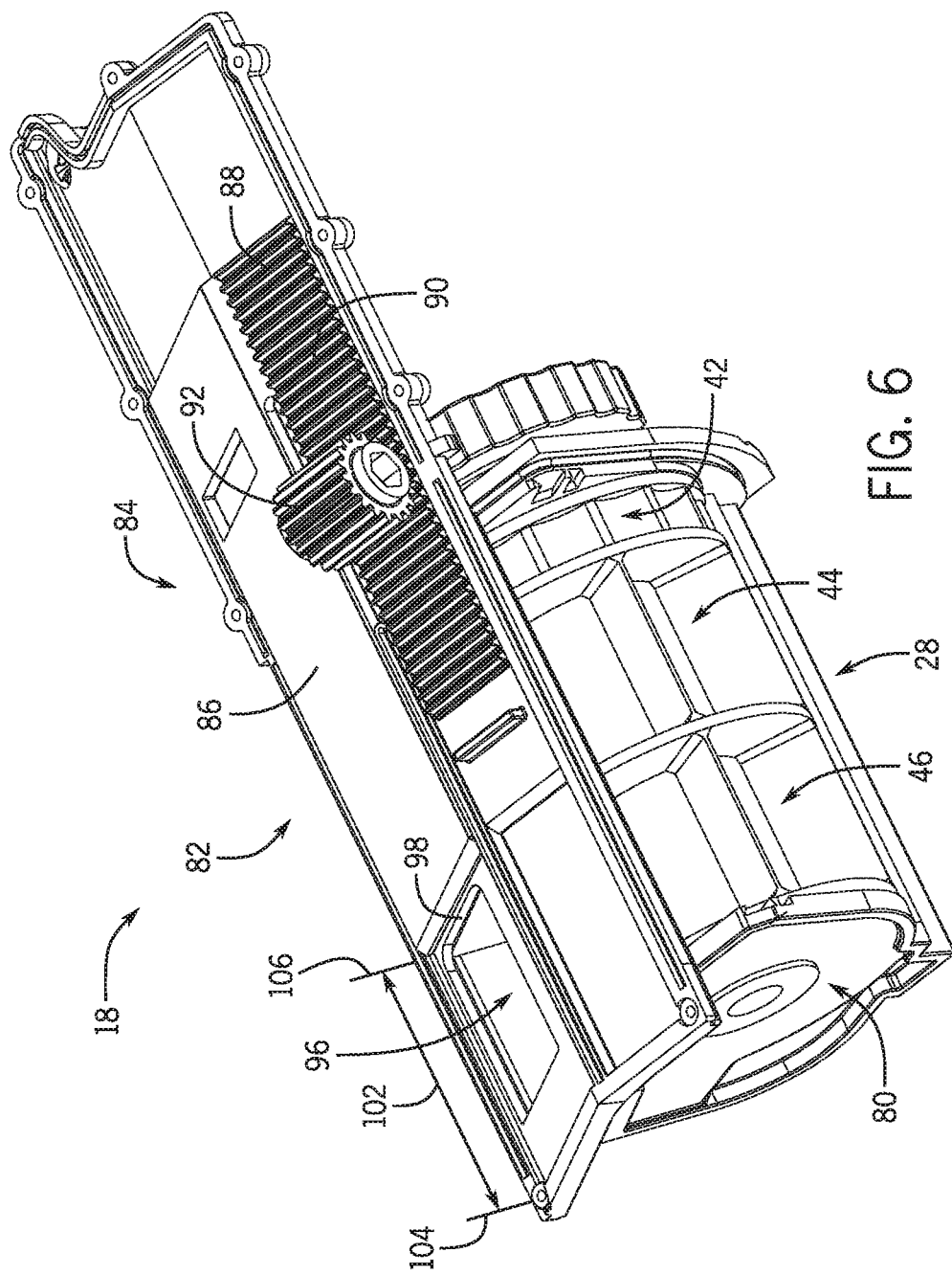
FIG. 6 is a perspective view of an embodiment of the metering assembly of FIG. 5 with a slide in a partially open position.

FIG. 6 is a perspective view of an embodiment of the metering assembly 18 with the slide 80 in a partially open position 106. The partially open position 106 exposes the second hole 96, while covering the first hole 94. With the first hole 94 covered, the amount of product 26 flowing through the metering assembly 18 is restricted. This may be desirable for products 26 that are delivered with a fairly high flow rate, but not enough for both segments (e.g., 44 and 46). The slide 80 is moved into the partially open position 106 when the groove wheel 92 rotates to translate the groove panel 88 and the rest of the slide 80 within the slide track 84. As explained below, the roller housing 82 includes slats in addition to the dividing rings 48, 50, 52, 54 to block flow of the product 26 between segments (e.g., 42, 44, 46). For example, in FIG. 6, the slide 80 covers the first hole 94, and substantially all (e.g., greater than 95 percent, 96 percent, 97 percent, 98 percent, 99 percent, or more) of the product 26 is blocked from passing from the third segment 46 to the second segment 44.

Figure 7:
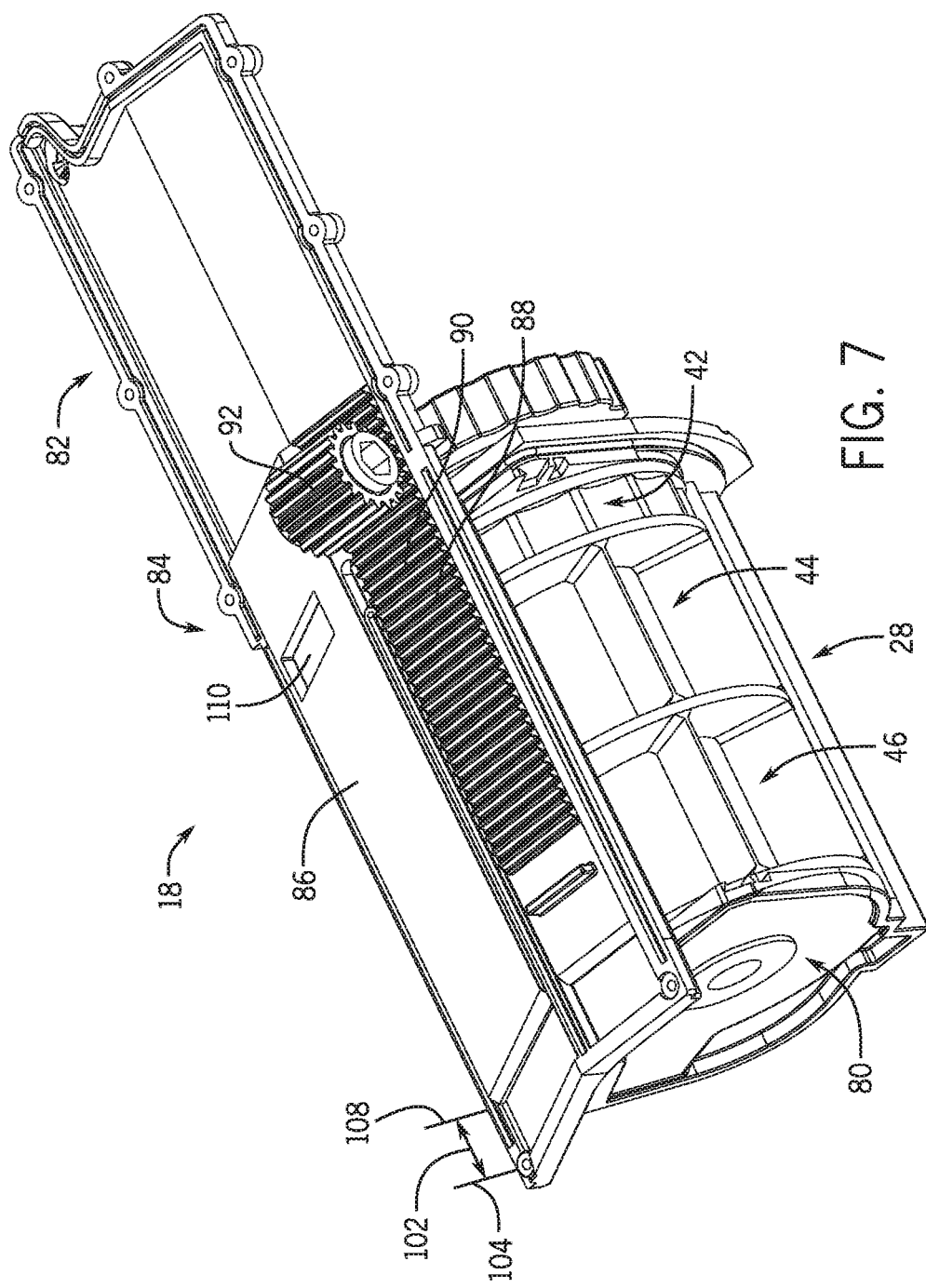
FIG. 7 is a perspective view of an embodiment of the metering assembly of FIG. 5 with a slide in a closed position.

FIG. 7 is a perspective view of an embodiment of the metering assembly 18 with the slide 80 in a closed position 108. In the closed position 108, each of the holes (e.g., first hole 94, second hole 96) is covered by the cutoff panel 86 of the slide 80, blocking substantially all of the product 26 from passing to the meter roller 28. The open distance 102 of the slide 80 at the closed position 108 may be greater than zero, as illustrated, when the slide 80 includes a fine segment hole 110. In each of the open position 100, partially closed position 106, and closed position 108, the fine segment hole 110 is positioned over the slide track 84 and, thus, the product 26 is blocked from the segments 42, 44, 46 of the meter roller 28.

Figure 8:
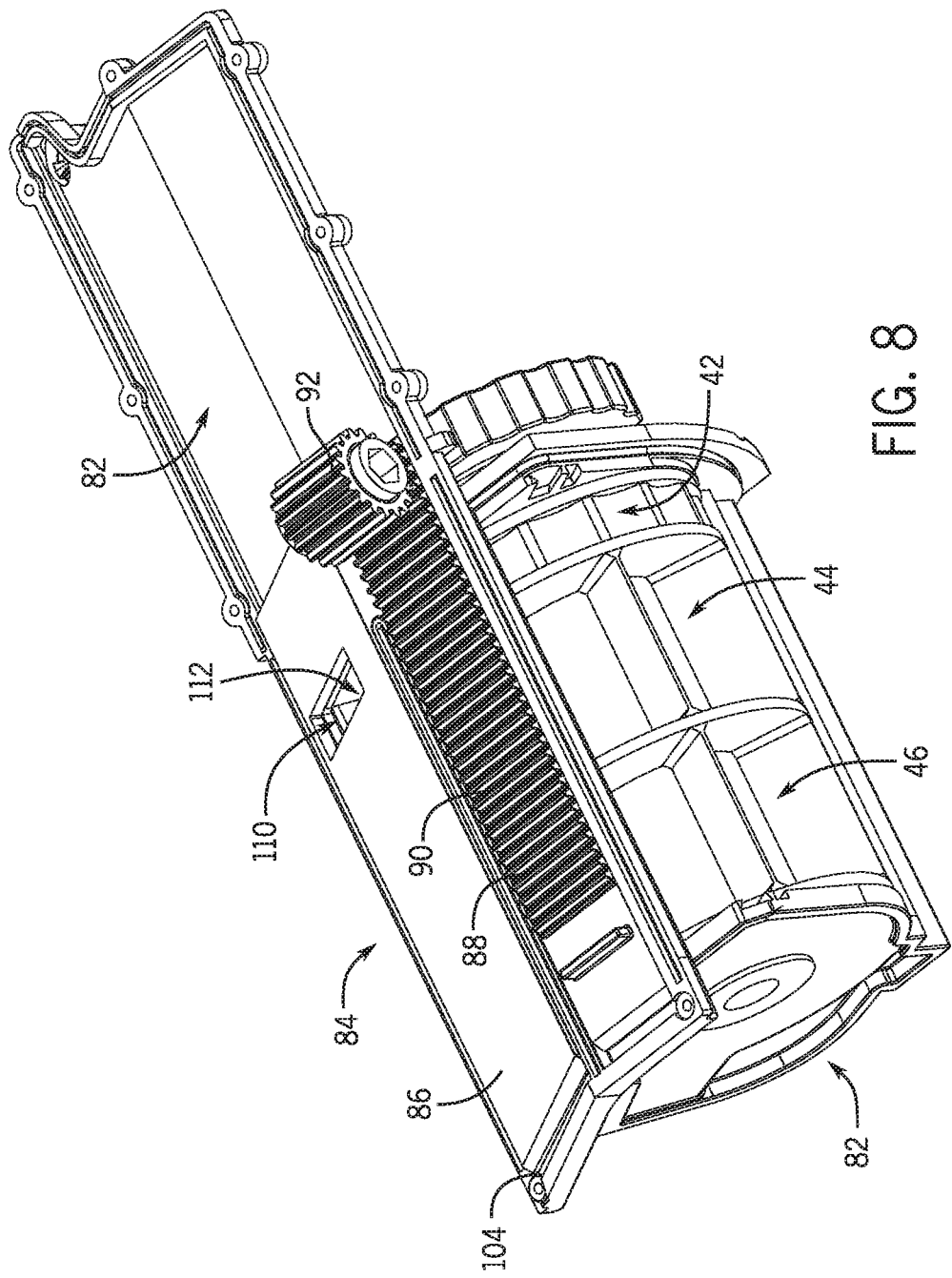
FIG. 8 is a perspective view of an embodiment of the metering assembly of FIG. 5 with a slide in a partially open position.

FIG. 8 is a perspective view of an embodiment of the metering assembly 18 with the slide 80 translated to the distal end 104 of the slide track 84. The fine segment hole 110 is positioned over a third hole 112 in the roller housing 82, which is aligned with the first segment 42. Thus, when the slide 80 is translated fully to the distal end 104 of the slide track 84, product 26 may flow through to the first segment 42. As with the other positions of the slide 80 within the slide track 84, rotation of the groove wheel 92 causes translation of the groove panel 88, and thus the whole of the slide 80. In certain embodiments, the fine segment hole 110 may be covered by a second slide that opens independently of the slide 80. In such embodiments, the slide may only include three positions (e.g., open 100, partially closed 106, and closed 108), and the third hole 112 of the roller housing 82 would be unblocked by opening the second slide.

Figure 9:
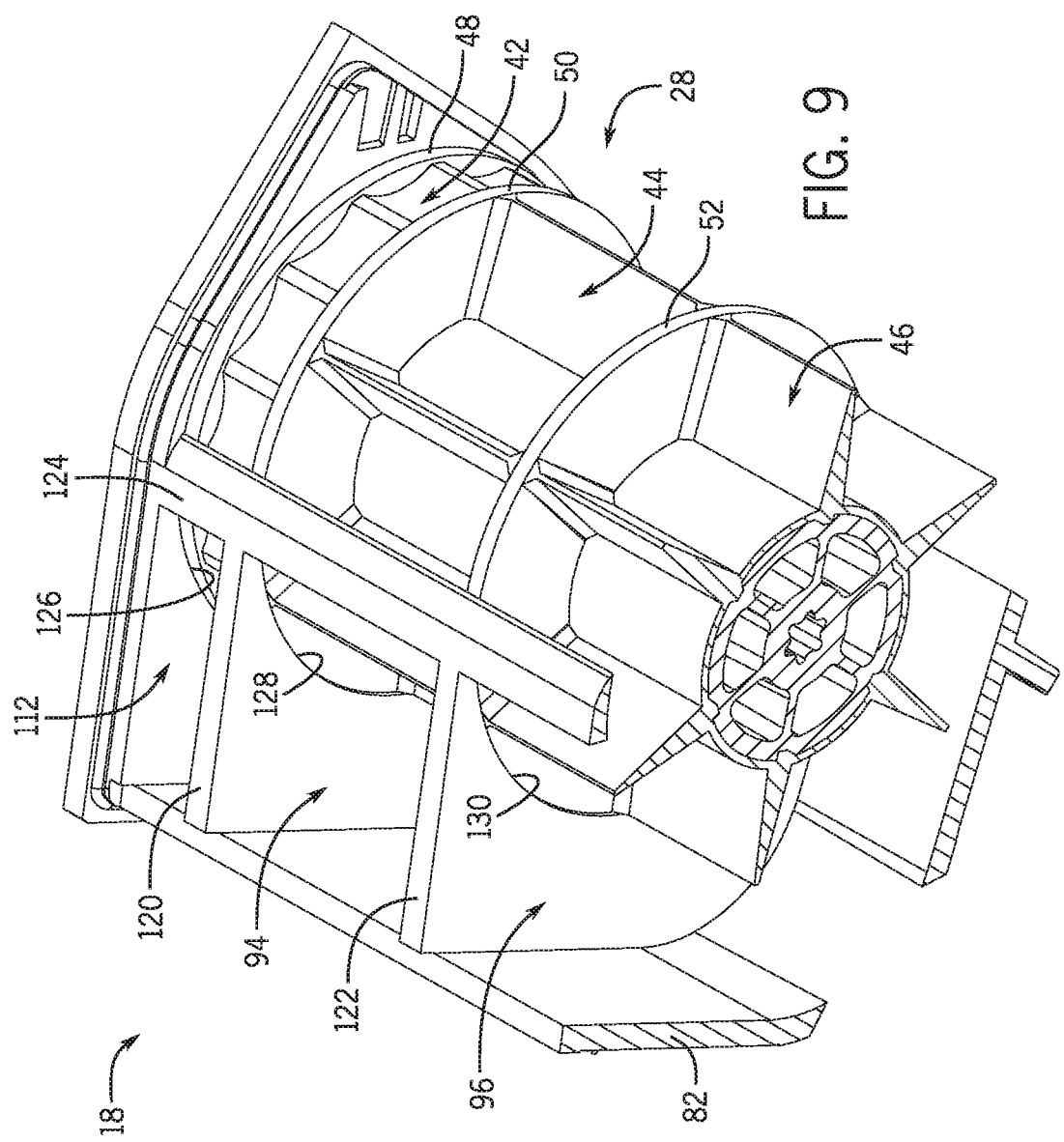
FIG. 9 is a cross-sectional view of an embodiment of the metering assembly of FIG. 5.

FIG. 9 is a cross-sectional perspective view of an embodiment of the metering assembly 18. The slide 80 is not illustrated, but in certain embodiments may be present as described above. The slide 80 translates between positions located over a first dividing slat 120 and a second dividing slat 122. The slats 120, 122 are held in place by the roller housing 82 and a connecting strip 124 that maintains the relative distances between the slats 120, 122. The first dividing slat 120 is positioned between the first hole 94 and the third hole 112 (and thus between the first segment 42 and the second segment 44). The second dividing slat 122 is positioned between the first hole 94 and the second hole 96 (and thus between the second segment 44 and the first segment 46). Each dividing slat (e.g., 120, 122) is aligned with (e.g., positioned adjacent to) a dividing ring (e.g., 48, 50, 52) and includes an interface (e.g., 126, 128, 130) that generally corresponds to a shape of a corresponding dividing ring (e.g., 48, 50, 52). The first ring 48 matches the first interface 126, the second ring 50 matches the second interface 128 of the first dividing slat 120, and the third ring 52 matches the third interface 130 of the second dividing slat 122. This configuration blocks substantially all of the product 26 flowing in one segment (e.g., first segment 42) from transferring to another segment (e.g., second segment 44), and vice versa.

Figure 10:
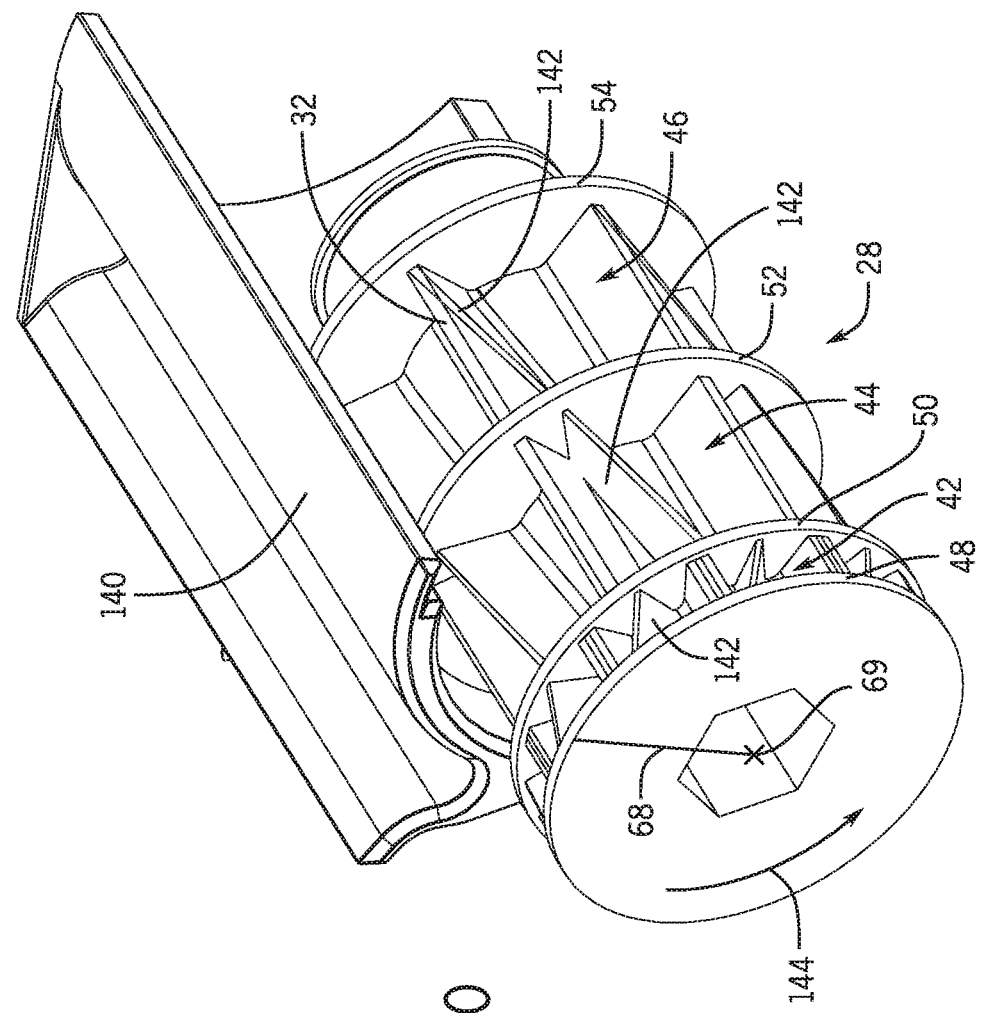
FIG. 10 is a cross-sectional view of an embodiment of the metering assembly of FIG. 5 having a curved slide.

FIG. 10 is a perspective view of an embodiment of the meter roller 28 having a curved slide 140. The curved slide 140 is shaped to substantially match the meter roller 28 such that the outer radius 68 of each dividing ring (e.g., 48, 50, 52) fits flush against the curved slide 140. Substantially match means that the tolerance between the curved slide 140 and the dividing ring (e.g., 48, 50, 52) is less than the average radius of the product 26 that is passing through the metering assembly 18. The curved slide 140 may thus be used in lieu of the dividing slats (e.g., first dividing slat 120, second dividing slat 122) and block substantially all of the product 26 from transferring from one segment (e.g., first segment 42) to a different segment (e.g., second segment 44). As with the slide 80 in FIGS. 5-9, the curved slide 140 translates relative to the axial axis 69 of the meter roller 28. The curved slide 140 may include a groove panel 88 that facilitates translation of the curved slide 140. In other embodiments, the curved slide 140 may be translated by hand, or by other mechanical or electronic translators. Additionally, in other embodiments, the curved slide 140 may translate in a rotational direction about the axial axis 69 of the meter roller 28.

FIG. 10 also illustrates an alternative configuration of the flutes 32 of the meter roller 28. As illustrated, the meter roller 28 may include the straight flutes 32 (e.g., extending along a radial axis) of the meter roller 28 but may also include angled flutes 142 (e.g., angled with respect to the radial axis) that urge the product 26 toward one dividing ring (e.g., 48, 50, 52, 54) or another. In many embodiments, the meter roller 28 includes one type of either straight flutes 32, or angled flutes 142. Some embodiments, however, may include both. The angled flutes 142 may be curved to form a spiral along the length of the meter roller 28, or may also have a wavy pattern along the length to direct the product 26 in a desired manner. In the illustrated embodiment, if the meter roller 28 rotates in a counter-clockwise direction 144, the angled flutes 142 in the coarse segment 44, 46 urge the product 26 toward the dividing rings on the right-hand side of the segment. That is, product 26 in the second segment 44 is urged toward the third dividing ring 52, and product 26 in the third segment 44 is urged toward the fourth dividing ring 54. On the other hand, the illustrated embodiment of the first segment 42 includes angled flutes 142 that urge the product in the other direction toward the first dividing ring 48.

Figure 11:
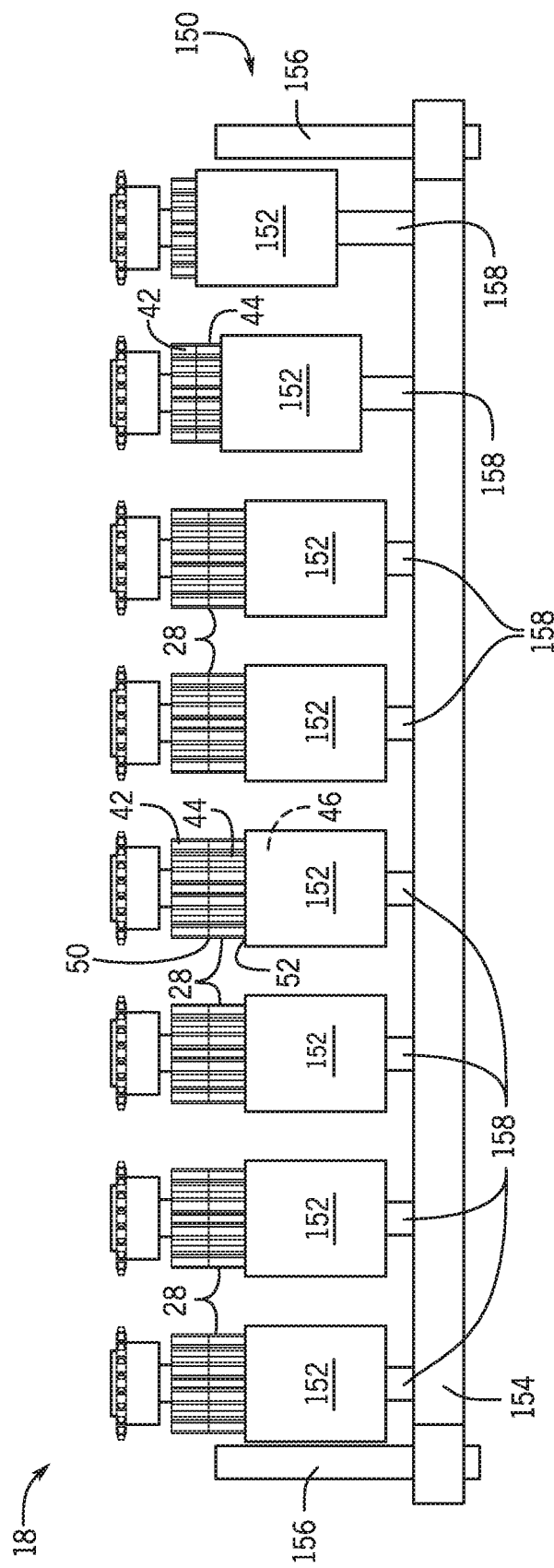
FIG. 11 is a schematic view of an embodiment of the meter assembly of FIG. 2.

FIG. 11 is a top view of an embodiment of the metering assembly 18 having multiple meter rollers 28 within a sleeve assembly 150. In the illustrated embodiment, meter rollers 28 are disposed within meter roller sleeves 152. The meter roller sleeves 152 are cup shaped or cylindrical, and are configured to surround at least a portion the meter rollers 28. In certain embodiments, the meter roller sleeves 152 may be configured to circumferentially surround an entire meter roller 28. As discussed in detail below, the meter roller sleeves 152 may assist in controlling the flow rate of product from the meter rollers 28. Furthermore, a sleeve adjustment bar 154 is coupled to each of the meter roller sleeves 152 via respective sleeve adjustment assemblies 158.

In addition, bar adaptors 156 are coupled to each end of the sleeve adjustment bar 154. The sleeve adjustment bar 154 and/or the bar adaptors 156 may be adjusted to cause the sleeves 152 to expose one or more of the segments (e.g., 42, 44, 46) of its respective meter roller 28. The meter roller sleeves 152 in combination with the various segments (e.g., 42, 44, 46) of each meter roller 28 may enable the metering assembly 18 to meter a variety of products with a single meter roller configuration (e.g., without replacing the meter rollers 28), as explained above. By combining multiple sleeves 152 to a single sleeve adjustment bar 154, an operator may quickly adjust all the meter rollers 28 to operate using the same segment or segments (e.g., first segment 42 for canola).

In addition to controlling the collective group of meter roller sleeves 152, individual meter roller sleeves 152 may be independently adjusted to deliver more or less product to various locations from the air cart 10. For example, the sleeve adjustment assembly 158 of a particular meter roller sleeve 152 may be adjusted to cause the meter roller sleeve 152 to block various segments (e.g., 42, 44, 46) of the meter roller 28. Each sleeve 152 is independently adjusted to line up with the dividing ring of the designated segment (e.g., dividing ring 50 for first segment 42). Specifically, each meter roller sleeve 152 may be independently adjusted, for example, by rotating the meter roller sleeve 152 about a threaded rod of the sleeve adjustment assembly 158, thereby extending or retracting the sleeve 152. Alternatively, each meter roller sleeve 152 may be independently adjusted by rotating an adjustment bolt of the sleeve adjustment assembly 158. Such fine tuning may be used to adjust product flow rate to particular groups of row units, thereby compensating for variations in the number of row units per group or variations in desired product application rates across the field, for example.

Figure 12:
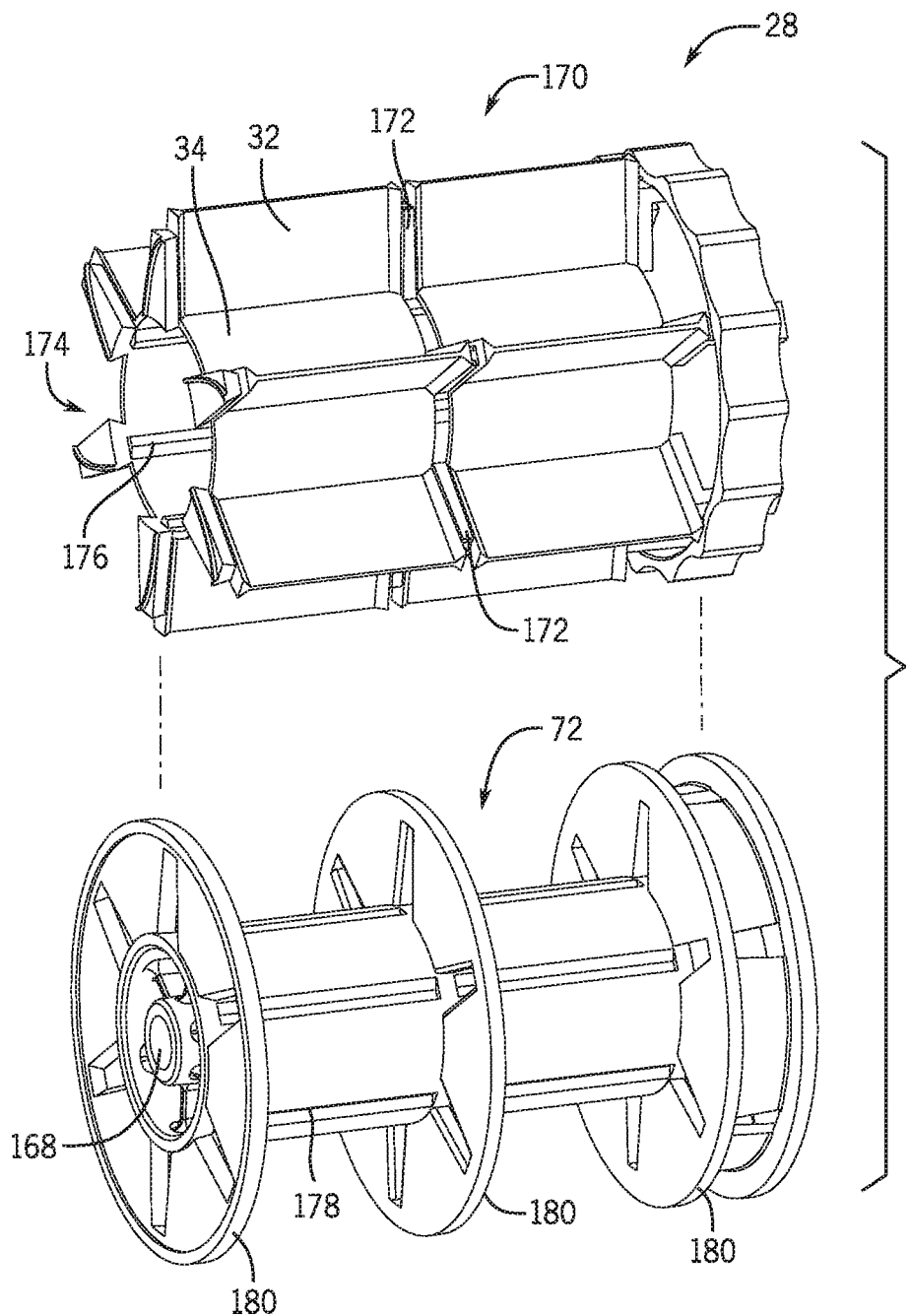
FIG. 12 is an exploded perspective view of the meter roller 28 as shown in FIG. 3.

FIG. 12 is an exploded perspective view of the meter roller 28. The meter roller 28 includes the driven shaft 72 and a fluted portion 170. The fluted portion 170 of the meter roller 28 includes flutes 32, recesses 34, and/or interlocking protrusions 172 (e.g., interlocking axial protrusions). The fluted portion 170 includes a cavity 174 for receiving and coupling to the driven shaft 72. The fluted portion 170 may non-rotatably couple to the driven shaft 72 via engagement of grooves 176 (e.g., radially inward protrusions) of the fluted portion 170 with chamfers 178 (e.g., radially inward recesses) of the driven shaft 72. As shown in FIG. 12, the driven shaft 72 is separated by multiple rings 180. Each ring 180 may interlock with a corresponding interlocking segment 172 (e.g., via a cutout configured to conform to the interlocking segments 172) to form the segments (42, 44, 46) of the meter roller 28. The segments (e.g., 42, 44, 46) may be selected (e.g., exposed as set forth above. For instance, seeds may only be deposited in one, two, or all three roller segments (42, 44, 46) depending on a position of the slide 80. As such, there is segmentation of the meter roller 28 so that the meter roller can accommodate a wide range of products and application rates. While the meter roller 28 in FIG. 12 has three rings 180, the meter roller may include no ring or additional rings in alternative embodiments. In some embodiments, the rings 180 and driven shaft 72 may be formed from one piece of molded plastic. The fluted portion 170 may be an overmold that is molded over the driven shaft 72. The fluted portion 170 may be mechanically bonded and/or chemically bonded to the driven shaft 72. The grooves 176 and chamfers 178 may non-rotatably couple the fluted portion 170 and the driven shaft 72. In an alternate embodiment, the rings 180, and the segments (e.g., 42, 44, 46) may be separate parts that may be coupled to one another. Additionally, in an alternate embodiment of the fluted portion 170, the flutes, recesses, and/or ring segments may be separate parts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural metering system, comprising:
a housing configured to receive product from an agricultural product storage compartment via an opening in the housing;
a meter roller disposed within the housing and configured to meter the product to a product distribution system via rotation of the meter roller, wherein the meter roller comprises:
a first meter roller segment having a first plurality of flutes and a corresponding first plurality of recesses;
a second meter roller segment having a second plurality of flutes and a corresponding second plurality of recesses, wherein the first meter roller segment has a first profile, the second meter roller segment has a second profile, and the first profile is different from the second profile; and
a dividing ring disposed axially between the first meter roller segment and the second meter roller segment, wherein the dividing ring is non-rotatably coupled to the first meter roller segment and to the second meter roller segment; and
a meter roller sleeve configured to surround the meter roller and to translate axially relative to the meter roller to selectively block the product from flowing through one of the first and second meter roller segments while enabling the product to flow through the other of the first and second meter roller segments, and to enable the product to flow through both of the first and second meter roller segments.

2. The agricultural metering system of claim 1, wherein the first profile is finer than the second profile.

3. The agricultural metering system of claim 2, wherein the first plurality of flutes has a greater number of flutes than the second plurality of flutes.

4. The agricultural metering system of claim 1, wherein the first meter roller segment has a first axial length, the second meter roller segment has a second axial length, and the first axial length is different from the second axial length.

5. The agricultural metering system of claim 1, wherein the meter roller comprises:
a third meter roller segment having a third plurality of flutes and a corresponding third plurality of recesses; and
an additional dividing ring disposed axially between the second meter roller segment and the third meter roller segment, wherein the additional dividing ring is non-rotatably coupled to the second meter roller segment and to the third meter roller segment, and the meter roller sleeve is configured to selectively block the product from flowing through one of the first, second, and third meter roller segments, through two of the first, second, and third meter roller segments, and through three of the first, second, and third meter roller segments.

6. The agricultural metering system of claim 1, wherein the meter roller sleeve has a cylindrical shape.

7. An agricultural metering system, comprising:
a meter roller configured to meter product to a product distribution system via rotation of the meter roller, wherein the meter roller comprises:
a first meter roller segment having a first plurality of flutes and a corresponding first plurality of recesses;
a second meter roller segment having a second plurality of flutes and a corresponding second plurality of recesses; and
a dividing ring disposed axially between the first meter roller segment and the second meter roller segment, wherein the dividing ring is non-rotatably coupled to the first meter roller segment and to the second meter roller segment; and
a meter roller sleeve configured to surround the meter roller and to translate axially relative to the meter roller to selectively block the product from flowing through one of the first and second meter roller segments while enabling the product to flow through the other of the first and second meter roller segments, and to enable the product to flow through both of the first and second meter roller segments.

8. The agricultural metering system of claim 7, wherein the first meter roller segment has a first profile, the second meter roller segment has a second profile, and the first profile is different from the second profile.

9. The agricultural metering system of claim 8, wherein the first profile is finer than the second profile.

10. The agricultural metering system of claim 9, wherein the first plurality of flutes has a greater number of flutes than the second plurality of flutes.

11. The agricultural metering system of claim 7, comprising a housing configured to receive the product from an agricultural product storage compartment via an opening in the housing, wherein the meter roller is disposed within the housing.

12. The agricultural metering system of claim 7, wherein the first meter roller segment has a first axial length, the second meter roller segment has a second axial length, and the first axial length is different from the second axial length.

13. The agricultural metering system of claim 7, wherein the meter roller comprises:
a third meter roller segment having a third plurality of flutes and a corresponding third plurality of recesses; and
an additional dividing ring disposed axially between the second meter roller segment and the third meter roller segment, wherein the additional dividing ring is non-rotatably coupled to the second meter roller segment and to the third meter roller segment, and the meter roller sleeve is configured to selectively block the product from flowing through one of the first, second, and third meter roller segments, through two of the first, second, and third meter roller segments, and through three of the first, second, and third meter roller segments.

14. The agricultural metering system of claim 7, wherein the meter roller sleeve has a cylindrical shape.

15. An agricultural metering system, comprising:
a housing configured to receive product from an agricultural product storage compartment via an opening in the housing;
a meter roller disposed within the housing and configured to meter the product to a product distribution system via rotation of the meter roller, wherein the meter roller comprises:
a first meter roller segment having a first plurality of flutes and a corresponding first plurality of recesses;
a second meter roller segment having a second plurality of flutes and a corresponding second plurality of recesses, wherein the first meter roller segment has a first profile, the second meter roller segment has a second profile, and the first profile is different from the second profile, and wherein the first meter roller segment has a first axial length, the second meter roller segment has a second axial length, and the first axial length is different from the second axial length; and
a dividing ring disposed axially between the first meter roller segment and the second meter roller segment, wherein the dividing ring is non-rotatably coupled to the first meter roller segment and to the second meter roller segment; and
a meter roller sleeve configured to surround the meter roller and to translate axially relative to the meter roller to selectively block the product from flowing through one of the first and second meter roller segments and through both of the first and second meter roller segments.

16. The agricultural metering system of claim 15, wherein the first profile is finer than the second profile.

17. The agricultural metering system of claim 16, wherein the first plurality of flutes has a greater number of flutes than the second plurality of flutes.

18. The agricultural metering system of claim 15, wherein the meter roller comprises:
a third meter roller segment having a third plurality of flutes and a corresponding third plurality of recesses; and
an additional dividing ring disposed axially between the second meter roller segment and the third meter roller segment, wherein the additional dividing ring is non-rotatably coupled to the second meter roller segment and to the third meter roller segment, and the meter roller sleeve is configured to selectively block the product from flowing through one of the first, second, and third meter roller segments, through two of the first, second, and third meter roller segments, and through three of the first, second, and third meter roller segments.

19. The agricultural metering system of claim 15, wherein the meter roller sleeve has a cylindrical shape.

* * * * *